United States Patent [19]

Takakura et al.

[11] Patent Number: 5,686,830

[45] Date of Patent: Nov. 11, 1997

[54] METHOD OF SUPPLYING POSITIVE TEMPERATURE COEFFICIENT THERMISTOR ELEMENTS TO THE RECEIVING AND TRANSMITTING SIDES OF A COMMUNICATION DEVICE

[75] Inventors: Kenji Takakura; Yuichi Takaoka, both of Nagaokakyo, Japan

[73] Assignee: Muarata Manufacturing Co., Ltd., Japan

[21] Appl. No.: 658,683

[22] Filed: Jun. 5, 1996

Related U.S. Application Data

[63] Continuation of Ser. No. 210,211, Mar. 18, 1994, abandoned.

[30] Foreign Application Priority Data

Mar. 22, 1993 [JP] Japan .................... 5-088008

[51] Int. Cl.$^6$ .................... G01R 27/02
[52] U.S. Cl. .................... 324/73.1; 209/573
[58] Field of Search .................... 324/73.1; 209/574, 209/573; 333/17.3, 112, 130

[56] References Cited

U.S. PATENT DOCUMENTS

| | | | |
|---|---|---|---|
| 2,468,843 | 5/1949 | Sunstein | 209/574 |
| 2,752,039 | 6/1956 | Woodell et al. | 209/574 |
| 3,109,227 | 11/1963 | Goodyear . | |
| 4,286,114 | 8/1981 | Dannenmann, Jr. et al. | 379/206 |
| 5,073,762 | 12/1991 | Yu | 333/112 |

FOREIGN PATENT DOCUMENTS 0014818  12/1979  European Pat. Off. .

OTHER PUBLICATIONS

Radio Shack 1993 Catalog, Copyrighted 1992, p. 118, Captioned:1/4 Watt, 5% Tolerence Carbon Resistors 5–packs.

Cramer Buyer's Guide 1976 Catalog, p. 208, Captioned:Reel–packaged Fixed Composition Resistors, Stock Value Decade.

Radio Shack 1994 Catalog, Copyrighted 1993, pp. 128, 125, Captioned:1/4 Watt, 5% Tolerance Carbon Resistor 5–Packs, item (5) Junper Wire Kit respectively.

Primary Examiner—Ernest F. Karlsen
Assistant Examiner—Russell M. Kobert
Attorney, Agent, or Firm—Ostrolenk, Faber, Gerb & Soffen, LLP

[57] ABSTRACT

A method of supplying positive temperature coefficient thermistor elements in which a plurality of positive temperature coefficient thermistor elements 1 are divided into groups $G_1$ to $G_8$ for each range of predetermined resistance values, two arbitrary positive temperature coefficient thermistor elements are taken out of one of the groups $G_1$ to $G_8$ and supplied as one set of positive temperature coefficient thermistor elements.

2 Claims, 2 Drawing Sheets

COMMUNICATIONS DEVICE

METHOD OF SUPPLYING POSITIVE TEMPERATURE COEFFICIENT THERMISTOR ELEMENTS TO THE RECEIVING AND TRANSMITTING SIDES OF A COMMUNICATION DEVICE

This is a Continuation of application Ser. No. 08/210,211 filed on Mar. 18, 1994 now abandoned.

BACKGROUND OF THE INVENTION

1. Field of the Invention

The present invention relates generally to a method of supplying a set of positive temperature coefficient thermistor elements, the set being comprised of a plurality of positive temperature coefficient thermistor elements. More particularly, the method of supplying positive temperature coefficient thermistor elements can be effectively used for, for example, supplying positive temperature coefficient thermistor elements used on the receiving side and the transmitting side of one line of a communication device for the purpose of overcurrent protection.

2. Description of the Prior Art

The resistance of positive temperature coefficient thermistor elements used for a communication device for the purpose of overcurrent protection is generally in the range of 3 to 100Ω. Respective positive temperature coefficient thermistor elements are used on the transmitting side and the receiving side of one line, that is, two positive temperature coefficient thermistor elements are used for each line.

The resistance deviation of the positive temperature coefficient thermistor elements is Generally ±20 to 30%. Consider a case where the positive temperature coefficient thermistor elements are incorporated in the communication device without considering and correcting the resistance deviation. In this case, if there is a difference in resistance between the positive temperature coefficient thermistor elements on the receiving side and the transmitting side, a difference arises between voice volumes on the transmitting side and the receiving side.

In order to solve such a problem, therefore, resistance which is allowed by the positive temperature coefficient thermistor elements compared to the resistance which is allowed for the other components employed for overcurrent protection has been conventionally made low to maintain the whole resistance of the transmitting side and that of the receiving side in balance. Specifically, the resistance values of the positive temperature coefficient thermistor elements are decreased so that the absolute difference in resistance between the positive temperature coefficient thermistor elements on the transmitting side and the receiving side becomes small even if the positive temperature coefficient thermistor elements are the same in resistance deviation.

However, this method cannot, in some cases, be used because the resistance balance is not maintained even if the resistance which is allowed by the positive temperature coefficient thermistor elements is decreased. In addition, the complexity of an external circuit may render the above described method unusable.

On the other hand, if the resistance and the resistance deviation of the positive temperature coefficient thermistor elements are 20Ω±20%, the resistance value thereof becomes a maximum of 24Ω and a minimum of 16Ω, so that a difference in resistance of 8Ω may arise for one line. If an attempt to set the difference within 1Ω is made, for example, it is necessary to set the resistance and the resistance deviation to 20Ω±2.5% (i.e., a maximum of 20.5Ω and a minimum of 19.5Ω). However, it is not easy to manufacture the positive temperature coefficient thermistor elements with such precision, so that a great burden is imposed on the manufacturing processes.

SUMMARY OF THE INVENTION

The present invention has been made in order to solve the above described problems and has for its object to provide a method of supplying positive temperature coefficient thermistor elements in which resistance deviation among the positive temperature coefficient (PTC) thermistor elements, in sets of a plurality of PTC elements, can be decreased without greatly changing the manufacturing processes, the manufacturing facilities and the like.

In order to attain the above described object, a method of supplying positive temperature coefficient thermistor elements used in sets of n (n being an integer) according to the present invention is characterized in that a plurality of positive temperature coefficient thermistor elements are divided into groups, each group having a range of predetermined resistance, and n arbitrary positive temperature coefficient thermistor elements are selected out of a plurality of positive temperature coefficient thermistor elements in each of the groups and are used as one set of positive temperature coefficient thermistor elements.

Furthermore, in the present invention, there is provided a set of positive temperature coefficient thermistor elements divided into groups for each range of predetermined resistance so as to use positive temperature coefficient thermistor elements in sets of n in accordance with the above described supplying method.

In the present invention, the respective positive temperature coefficient thermistor elements are divided into groups for each range of predetermined resistance, so that the difference in resistance between the positive temperature coefficient thermistor elements in each of the groups is small.

Consequently, two positive temperature coefficient thermistor elements, are taken out of the above-described one group and used, for example, as one set on the receiving side and the transmitting side of one line of a communication device; This makes it possible to reliably reduce the difference in resistance between the two positive temperature coefficient thermistor elements used as one set without changing the manufacturing processes and the manufacturing facilities to decrease the resistance deviation of a lot of positive temperature coefficient thermistor elements.

Since the necessity of selecting a positive temperature coefficient thermistor element depending on the resistance at the time of mounting, and the necessity of adjusting the other components are eliminated, the assembling operations become easy, thereby making it possible to reduce cost.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The characteristics of an embodiment of the present invention will be described in more detail.

Figure 2:
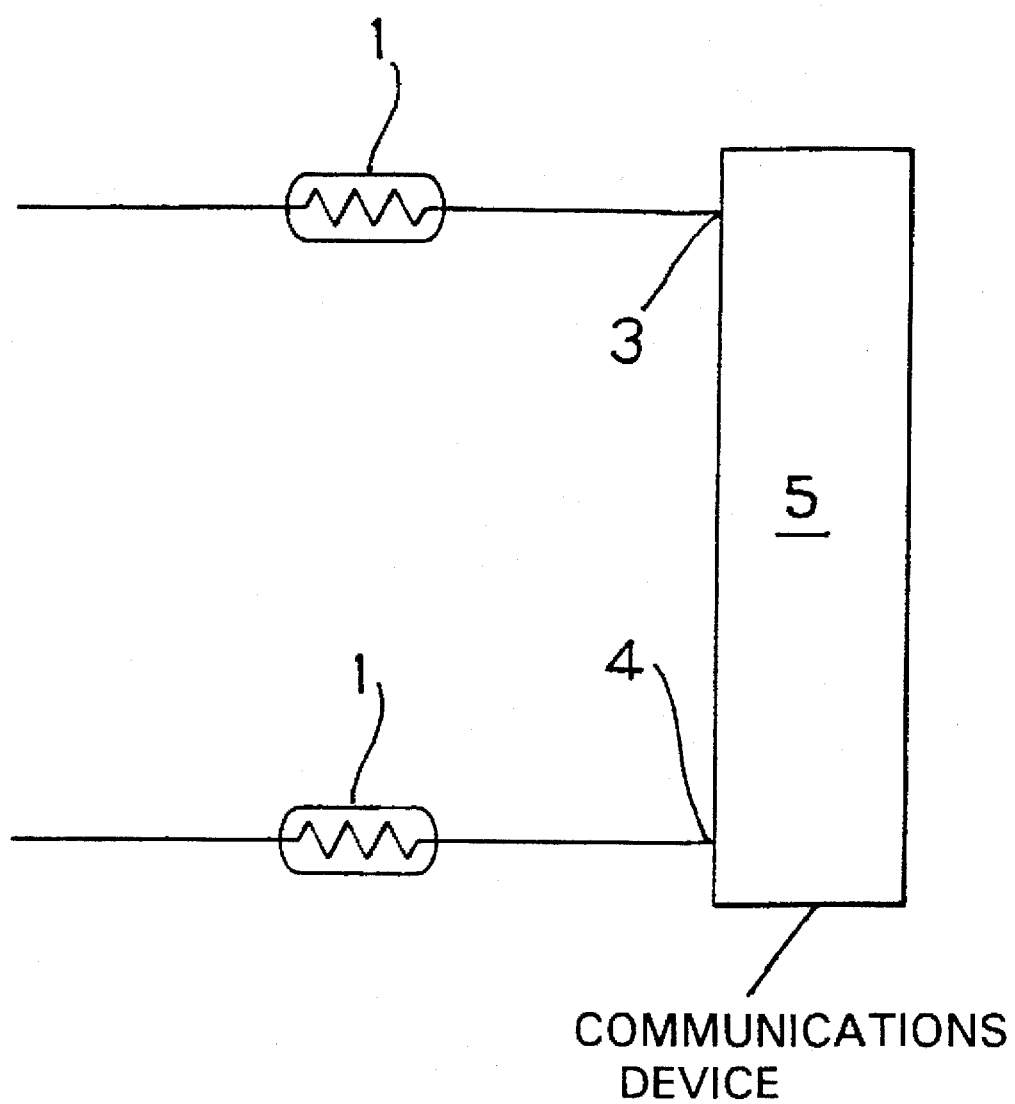
FIG. 2 is a block diagram schematic of a communication device embodying certain features of the present invention.

In the present embodiment, positive temperature coefficient thermistor elements having resistance and resistance deviation of 20Ω±20% are used. Furthermore, in the present embodiment, by way of example and not limitation a method is described of supplying a pair of positive temperature coefficient thermistor elements so that, as shown in FIG. 2, when positive temperature coefficient thermistor elements 1 in sets of two are used on the transmitting side 3 and the receiving side 4 of one line of a communication device 5 the difference in resistance between the two positive temperature coefficient thermistor elements (resistance tolerance) is within 1Ω.

First, a plurality of (a lot of) positive temperature coefficient thermistor elements having resistance and resistance deviation of 20Ω±20% are prepared. Since the resistance deviation of the positive temperature coefficient thermistor elements is ±20%, the resistance value of each of the positive temperature coefficient thermistor elements is in the range of 16Ω to 24Ω.

Figure 1:
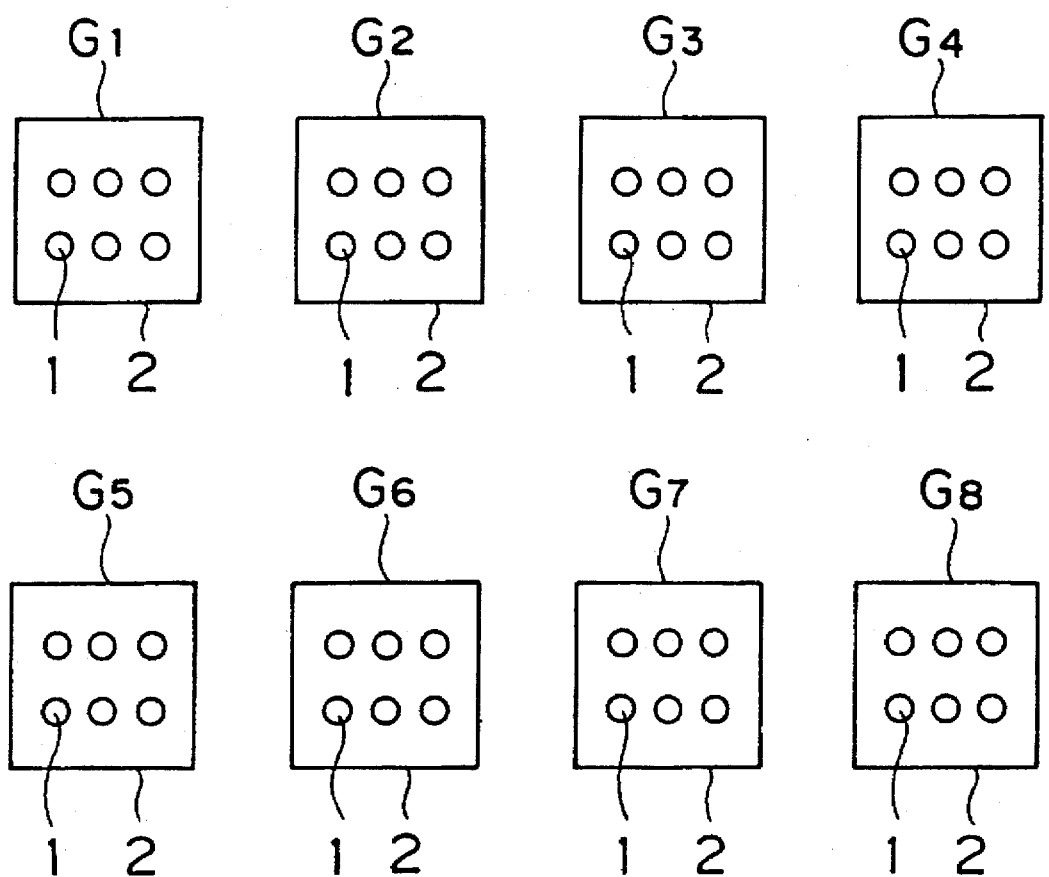
FIG. 1 is a diagram showing a method of supplying positive temperature coefficient thermistor elements according to an embodiment of the present invention.

As shown in FIG. 1, a plurality of positive temperature coefficient thermistor elements 1 are divided into 8 groups, that is, a group $G_1$ (resistance is 16 to 17Ω), a group $G_2$ (resistance is 17 to 18Ω), a group $G_3$ (resistance is 18 to 19Ω), a group $G_4$ (resistance is 19 to 20Ω), a group $G_5$ (resistance is 20 to 21Ω), a group $G_6$ (resistance is 21 to 22Ω), a group $G_7$ (resistance is 22 to 23Ω), and a group $G_8$ (resistance is 23 to 24Ω).

The grouped positive temperature coefficient thermistor elements in the range of predetermined resistance are contained in a container 2 such as a bag or a box for each group ($G_1$ to $G_8$).

When the positive temperature coefficient thermistor elements 1 are used in sets of two on the transmitting side 3 and the receiving side 4 of one line of the communication device 5 (FIG. 2) the positive temperature coefficient thermistor elements are divided into Groups ($G_1$ to $G_8$), and two positive temperature coefficient thermistor elements are taken out of positive temperature coefficient thermistor elements (a set of positive temperature coefficient thermistor elements) in one of groups (one arbitrary group out of the groups $G_1$ to $G_8$) contained in the container 2, and the respective one positive temperature coefficient thermistor elements are used on the transmitting side and the receiving side of one line of the communication device.

This makes it possible to reliably supply two positive temperature coefficient thermistor elements having small resistance deviation to the receiving side and the transmitting side of one line of the communication device using positive temperature coefficient thermistor elements having the present resistance deviation without changing the manufacturing processes and the manufacturing facilities to decrease the resistance deviation of a lot of positive temperature coefficient thermistor elements.

A resistance measuring device conventionally used can be used with almost no modification as a facility for dividing positive temperature coefficient thermistor elements into groups depending on the resistance, thereby avoiding any increase in the cost of the facility cost rises.

Although in the above described embodiment, a method of supplying positive temperature coefficient thermistor elements using positive temperature coefficient thermistor elements having resistance and resistance deviation of 20Ω±20% in which the difference in resistance between the two positive temperature coefficient thermistor elements (resistance tolerance) is within 1Ω was described by way of example, a method of supplying positive temperature coefficient thermistor elements according to the present invention is not limited to the above described embodiment. The method of supplying positive temperature coefficient thermistor elements is also applicable to a case where the resistance deviation, the resistance tolerance and the like of the positive temperature coefficient thermistor elements differ from those in the above described embodiment, in which case the same effect as that in the above described embodiment can be obtained.

Additionally, a method of supplying positive temperature coefficient thermistor elements according to the present invention is not limited to the above described embodiment even in the other respects. Various applications and modifications can be made in the range of the gist of the present invention with respect to the range of the resistance of positive temperature coefficient thermistor elements to be divided into one group, the number of groups, the number of positive temperature coefficient thermistor elements in one group, the type of positive temperature coefficient thermistor element, for example, the presence or absence of a terminal, the specific structure of a positive temperature coefficient thermistor element, the specific structure of a line of a communication device, and the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of supplying a set of two positive temperature coefficient thermistor elements to a communications device, the method comprising the steps of:

(a) measuring the resistance values of a plurality of positive temperature coefficient thermistor elements manufactured so that the elements have a target resistance value and an allowable resistance deviation value from said target value, each of the elements having the same target resistance value and the same allowable resistance deviation value;

(b) dividing the plurality of positive temperature coefficient thermistor elements measured in step (a) into a plurality of groups, each group having a range of predetermined resistance values which is narrower than said allowable resistance deviation value; and (c) taking two positive temperature coefficient thermistor elements as a set of positive temperature coefficient thermistor elements out of the positive temperature coefficient thermistor elements included in one of said plurality of groups and supplying one of the two positive temperature coefficient thermistor elements to the receiving side of one line of a communication device and supplying the other positive temperature coefficient thermistor element to the transmitting side of the same line to provide matched overcurrent protection on the receiving and transmitting sides.

2. The method of supplying positive temperature coefficient thermistor elements according to claim 1, further comprising the step of respectively containing in a container, after dividing the positive temperature coefficient thermistor elements into the plurality of groups, the positive temperature coefficient thermistor elements included in each of the groups.

\* \* \* \* \*